United States Patent
Yang et al.

(10) Patent No.: US 10,733,353 B2
(45) Date of Patent: Aug. 4, 2020

(54) SYSTEM AND METHOD FOR FORMING INTEGRATED DEVICE

(71) Applicant: TAIWAN SEMICONDUCTOR MANUFACTURING COMPANY LTD., Hsinchu (TW)

(72) Inventors: Yu-Tao Yang, Hsinchu County (TW); Yung-Chow Peng, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

(21) Appl. No.: 16/134,224

(22) Filed: Sep. 18, 2018

(65) Prior Publication Data

US 2020/0089837 A1 Mar. 19, 2020

(51) Int. Cl.
| | |
|---|---|
| *G06F 30/30* | (2020.01) |
| *G06F 30/398* | (2020.01) |
| *G06F 30/36* | (2020.01) |
| *G06F 30/367* | (2020.01) |
| *G06F 119/06* | (2020.01) |

(52) U.S. Cl.
CPC ............ *G06F 30/398* (2020.01); *G06F 30/36* (2020.01); *G06F 30/367* (2020.01); *G06F 2119/06* (2020.01)

(58) Field of Classification Search
CPC ...... G06F 30/398; G06F 30/36; G06F 30/367; G06F 2119/06
See application file for complete search history.

(56) References Cited

U.S. PATENT DOCUMENTS

| | | | | |
|---|---|---|---|---|
| 6,006,024 A * | 12/1999 | Guruswamy | ....... | G06F 17/5068 716/126 |
| 6,202,191 B1 * | 3/2001 | Filippi | ............. | H01L 21/76858 257/522 |
| 8,904,326 B2 * | 12/2014 | Huang | ................ | G06F 17/5036 716/106 |
| 9,501,593 B2 * | 11/2016 | Huang | ................ | G06F 17/5036 |
| 9,922,161 B2 * | 3/2018 | Kahng | ................ | G06F 17/5081 |
| 10,169,515 B2 * | 1/2019 | Sio | ......... | G06F 30/398 |
| 2004/0100398 A1 * | 5/2004 | Lin | ........ | G09G 3/2011 341/133 |
| 2006/0225012 A1 * | 10/2006 | Deura | ................ | G06F 17/5081 716/112 |
| 2008/0054941 A1 * | 3/2008 | Lines | ........ | G11C 8/08 326/63 |
| 2016/0188776 A1 * | 6/2016 | Huang | ................ | G06F 17/5036 716/107 |
| 2018/0151496 A1 * | 5/2018 | Biswas | ............. | H01L 21/76816 |
| 2019/0147134 A1 * | 5/2019 | Wang | ........ | G03F 1/36 716/52 |

* cited by examiner

*Primary Examiner* — Stacy Whitmore
(74) *Attorney, Agent, or Firm* — WPAT, P.C., Intellectual Property Attorneys; Anthony King

(57) ABSTRACT

A method for forming an integrated device includes the following operations. A first circuit layout is provided. The first circuit layout includes a first device and a connecting portion. A first voltage level is applied to the first circuit layout. The first circuit layout is analyzed according to the first voltage level to determine if a failing signal occurs in the first circuit layout. The first device is analyzed when the failing signal occurs. It is determined, according to a second voltage level, whether a violation occurs in the first device. The first circuit layout is modified when a violation occurs.

20 Claims, 8 Drawing Sheets

SYSTEM AND METHOD FOR FORMING INTEGRATED DEVICE

BACKGROUND

In advanced semiconductor fabrication technologies, the feature density and operating frequency of devices are being progressively raised in order to achieve better performance. To enable such advances, electronic design automation tools are widely used for facilitating design flows and ensuring the functional integrity of the manufactured integrated circuits (IC). The electronic design automation tools aid in establishing a software platform to evaluate the physical performance and electrical properties of the IC before the chip is fabricated. A variety of built-in device models and design rules are used to verify the performance of the circuit design, such as the functionality, power consumption, and feature geometries. The software platform can also simulate the physical behaviors and characteristics of the IC components in operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
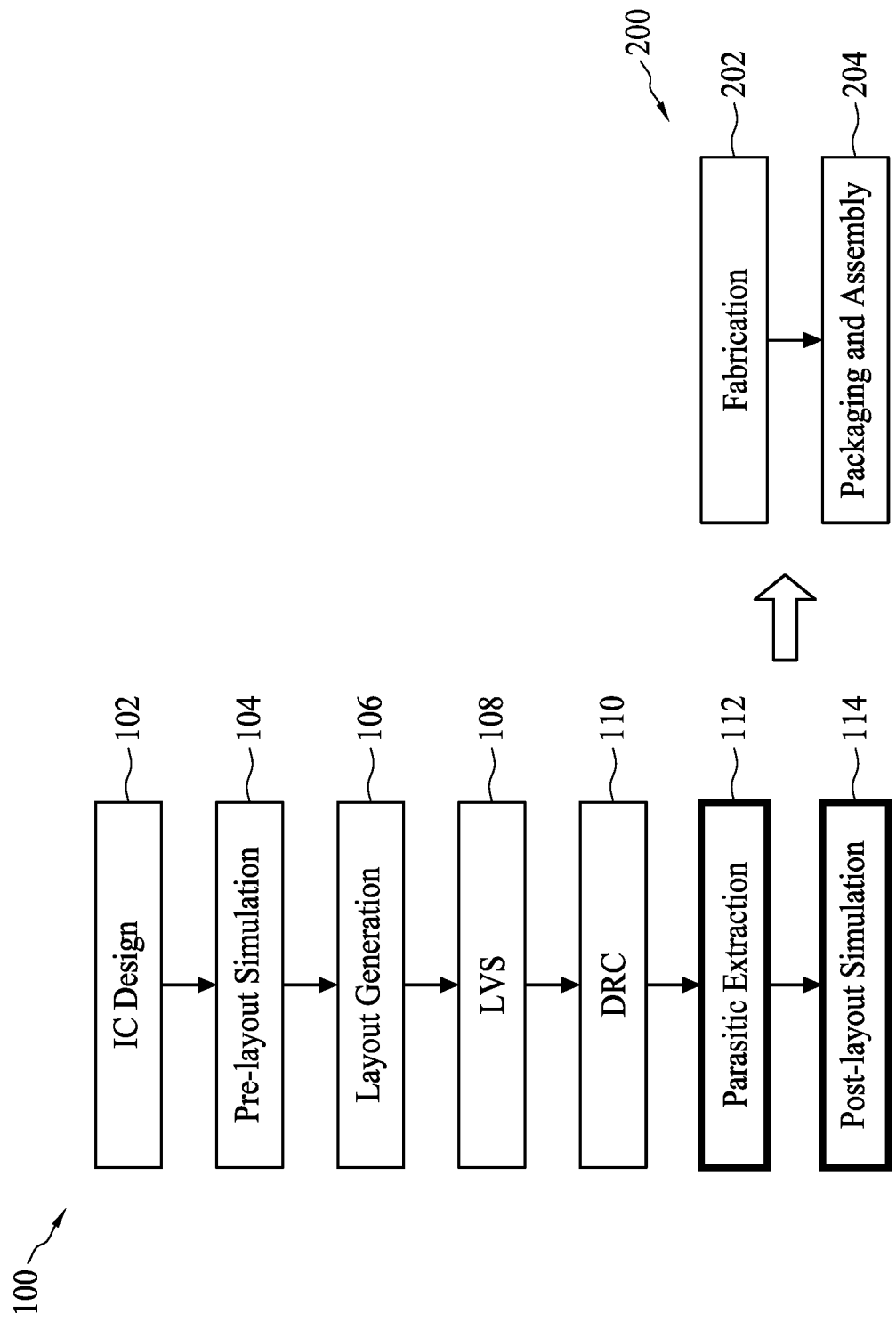
FIG. 1 is a flowchart of a chip design flow and a chip manufacturing flow of an integrated device or IC chip in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flowchart of a chip design flow 100 and a chip manufacturing flow 200 of an integrated device or IC chip in accordance with some embodiments. The design flow 100 utilizes one or more electronic design automation (EDA) tools to carry out one or more stages in the design flow 100. The chip manufacturing flow 200 manufactures the integrated device based on a result of the design flow 100.

At an IC design stage 102, a design of the integrated device is provided by a circuit designer. The design of the integrated device includes one or more circuit blocks and connectivities described by a pre-layout netlist. The pre-layout netlist does not include information regarding the physical implementation of the circuits and thus would not include information regarding sizing, spacing, and placement of the elements of the circuits as well as parasitic elements such as parasitic capacitors and parasitic resistors that arise due to the physical implementation. The term "netlist" used herein refers to both a circuit described graphically in a schematic and/or described textually.

At a pre-layout simulation stage 104, a pre-layout simulation is performed using the pre-layout netlist to determine if the design meets a predetermined specification. If the design does not meet the predetermined specification, the integrated device is redesigned.

At a layout generation stage 106, a layout of the integrated device is generated based on the design. In some embodiments, for standard cell designs, full custom layouts are created for cells, and the layout of the integrated device is generated by an automatic place-and-route tool using the cell layouts. In other embodiments, a full custom layout is created for the entire design. In still other embodiments, the layout of the integrated device includes both a full-custom portion and an automatically generated portion.

At a layout versus schematic (LVS) stage 108, an LVS check is performed to ensure the generated layout corresponds to the design. An LVS tool recognizes circuit elements and connections therebetween from patterns in the generated layout, and produces a post-layout netlist representing the recognized circuit elements and connections. The LVS tool then checks whether the post-layout netlist generated from the layout is equivalent to the pre-layout netlist generated from the design. If equivalence is not attained, the design flow 100 returns to the IC design stage 102 and/or the layout generation stage 106 to make correction.

At a design rule check (DRC) stage 110, a DRC check is performed on the layout to ensure that the layout satisfies certain manufacturing design rules such as the minimum width of a pattern in the layout, a minimum spacing between adjacent patterns in the layout, and a minimum area of a pattern in the layout. If one or more design rules are violated, correction is made to at least one of the layout or the design by returning to the IC design stage 102 or the layout generation stage 106. Some embodiments of the present disclosure are applied in this stage, as will be discussed in detail below.

At a parasitic extraction stage 112, parasitic elements, such as parasitic resistance and parasitic capacitance of interconnects in the layout, are determined and back-annotated in the post-layout netlist.

At a post-layout simulation stage 114, a post-layout simulation is performed on the post-layout netlist to determine whether the layout meets a predetermined specification. If the simulation indicates that the layout does not meet the predetermined specification, optimization is made to at least one of the design or the layout by returning to the IC design stage 102 or the layout generation stage 106. Otherwise, the layout undergoes additional verification process for signoff. For example, the post-layout simulation is a SPICE (Simulation Program with Integrated Circuit Emphasis) simulation.

In some embodiments, the chip manufacturing flow 200 includes a fabrication stage 202 and a packaging and assembly stage 204.

During the fabrication stage 202, the photomask(s) is used, for example, for one patterning operation for forming a feature of the integrated devices, such as gate lines of transistors, source or drain regions for the transistors, metal lines for interconnects and vias for the interconnects, on a wafer.

During the packaging and assembly stage 204, the integrated devices on the wafer are diced into IC chips and are packaged while taking into consideration, for example, protection from mechanical damage, cooling, electromagnetic interference and protection from electrostatic discharge. An IC chip may be assembled with other components for use.

The design flow 100 and the chip manufacturing flow 200 in FIG. 1 are exemplary. Other sequence of the stages, or partition of the stages, and/or additional stages before, between or after the stages shown are within the applicable scope of the present disclosure.

During the DRC check stage 110, the layout of the integrated device is checked to ensure that the layout satisfies certain manufacturing design rules. The DRC check stage 110 is discussed in detail below.

Figure 3:
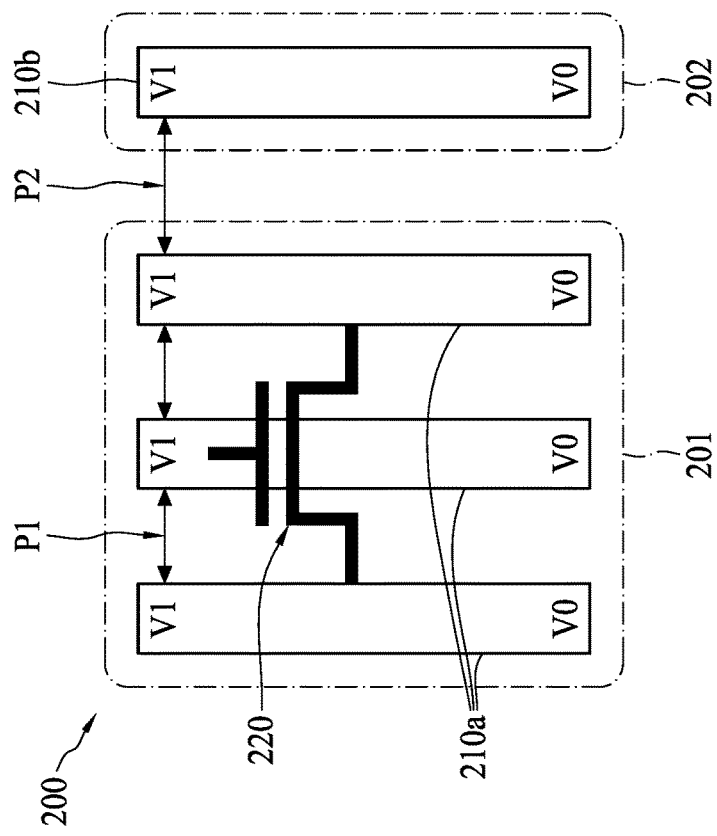
FIG. 2 and FIG. 3 are diagrams illustrating a circuit layout in accordance with some embodiments of the present disclosure.
Figure 2:
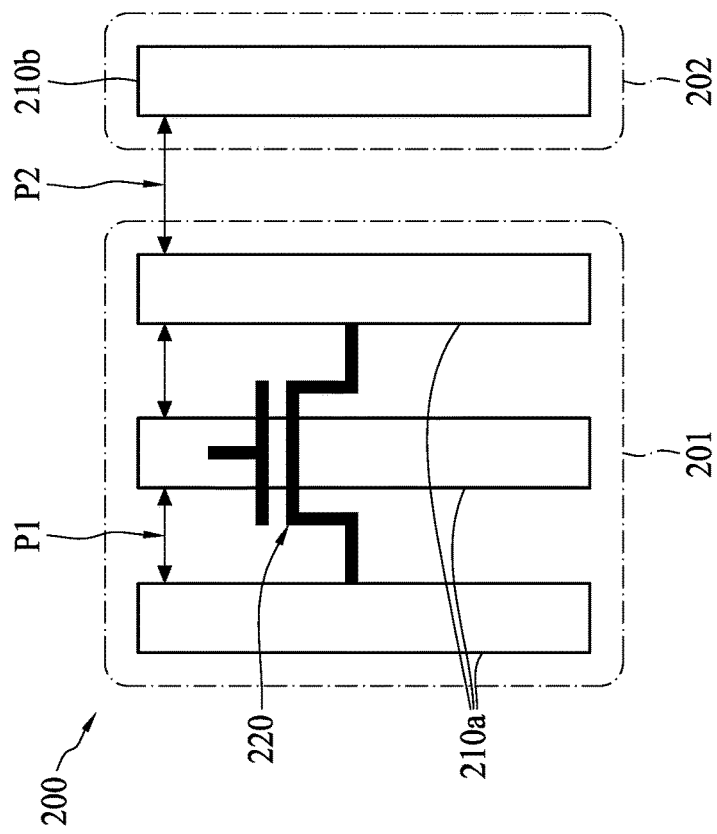

FIG. 2 and FIG. 3 are diagrams illustrating a circuit layout 200 in accordance with some embodiments of the present disclosure. The DRC check stage 110 in FIG. 1 may be performed on the circuit layout 200. Referring to FIG. 2, the circuit layout 200 includes a first device 201 and a connecting portion 202. The circuit layout 200 includes a layout of, for example, a semiconductor product. The semiconductor product may include an IC, a system on a chip (SoC), or a semiconductor device. In the present embodiment, the circuit layout 200 includes a plurality of conductive lines 210a and 210b in the first device 201 and the connecting portion 202, respectively. The shapes of the conductive lines 210a and 210b are not limited to rectangles. In addition, the conductive lines 210a and 210b may be formed in different layers.

In some embodiments, the first device 201 includes one of a transistor 220 (as in the present example), a resistor, a diode, or other electrical components. The transistor 220 may include a plurality of conductive lines 210a. For example, the transistor 220 includes three conductive lines 210a that form the gate line, source line, and drain line. The gate line is formed on a layer different from those of the source line and the drain line in the semiconductor product. The transistor 220 is, of course, merely an example and is not intended to be limiting.

The connecting portion 202 includes the conductive line 210b used to connect the first device 201 to other electrical devices (not shown). The connecting portion 202 may include wiring or connection node that connects the first device 201 to another device. In some embodiments, the connecting portion 202 is adjacent to the first device 301. Briefly, the connecting portion 202 is not included in any electrical devices and is used for electrically connecting the first device 201 to another electrical device. The number of the conductive lines 210b in the connecting portion 202 is, of course, merely an example and is not intended to be limiting.

The conductive lines 210a in the first device 201 are separated from each other by a pitch P1. The conductive line 210b in the connecting portion 202 is separated from an immediately adjacent conductive line 210a by a pitch P2. In the present embodiment, the pitch P1 is smaller than the pitch P2. In another embodiment, the pitch P1 is equal to or larger than the pitch P2. In some embodiments, the pitch P2 may also be the pitch between such conductive lines 210b in different connecting portions.

Referring to FIG. 3, a first voltage level $\Delta V1$ is applied to the first circuit layout 200. The first voltage level $\Delta V1$ is the difference between voltages V1 and V0. The voltage V1, a high reference voltage, may be the highest testing voltage in a predetermined testing level of the design rules for the circuit layout 200. The voltage V0, a low reference voltage, may be connected to ground that is 0V. For example, the design rules may include a plurality of predetermined testing levels such as 1.2 V, 2.4 V, or another value. The predetermined testing level for the circuit layout 200 may be determined as 1.2 V, and the voltage V1 is thus approximately 1.2 V. The first voltage level $\Delta V1$ is then V1−V0=1.2 V. The voltages of the predetermined testing levels are, of course, merely examples and are not intended to be limiting. It is noted that the predetermined testing level is related to the allowable pitch range between the conductive lines in the design rules and is decided according to the designed electrical devices in the first circuit layout 200.

The first circuit layout 200 is analyzed according to the first voltage level $\Delta V1$ to determine if a failing signal occurs in the first circuit layout 200. In some embodiments, the pitches P1 and/or P2 of the first circuit layout 200 are analyzed according to the first voltage level $\Delta V1$. The failing signal occurs when the pitches P1 and/or P2 is smaller than the allowable pitch range at the first voltage level $\Delta V1$. The failing signal indicates that the pitches P1 and/or P2 are not allowable pitches under the first voltage level $\Delta V1$. Briefly, the pitches P1 and/or P2 may not be allowed for some electrical devices according to the design rules.

The first device 201 is then analyzed when the failing signal occurs. In some embodiments, even the pitches P1 are practically allowable for the first device 201, the failing signal may still occur because the pitches P1 may be designed to be smaller than the allowable pitch range under the first voltage level $\Delta V1$ for a more compact circuit layout. The first voltage level $\Delta V1$ may be the predetermined allowable voltage of the first circuit layout 200 according to the design rules but not customized for the first device 301.

When the failing signal occurs, the EDA tools may re-check the circuit layout 200 to analyze the first device 201 and the connecting portion 201. The EDA tools distinguish the conductive lines 210a in the first device 201 from the conductive line 210b in the connecting portion 202. In some embodiments, The EDA tools determine which conductive lines 210a are in the first device 201.

Figure 4A:
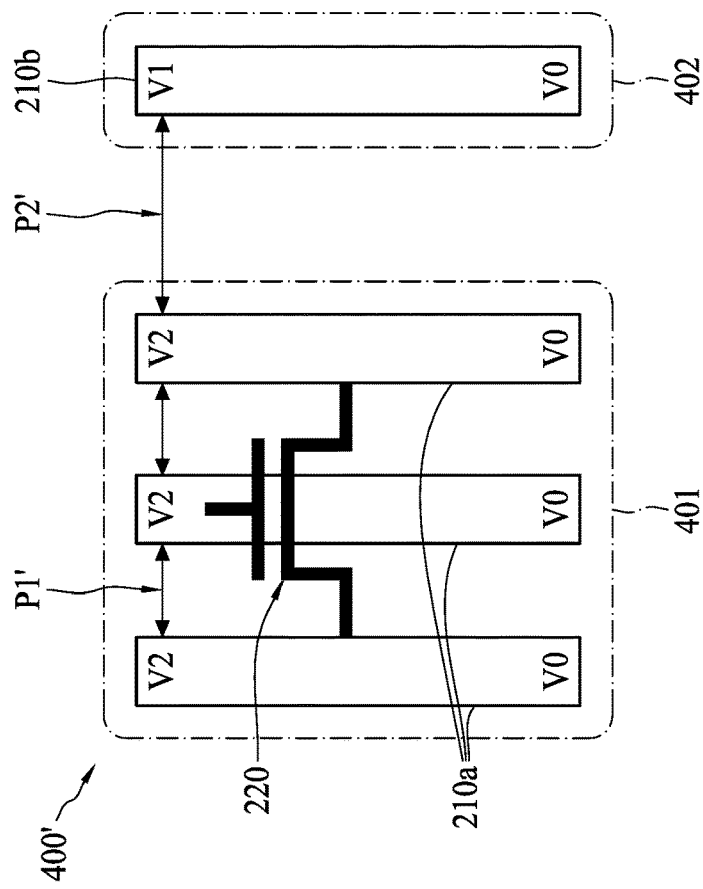
FIG. 4A and FIG. 4B are diagrams illustrating a circuit layout in accordance with some embodiments of the present disclosure.
Figure 4B:
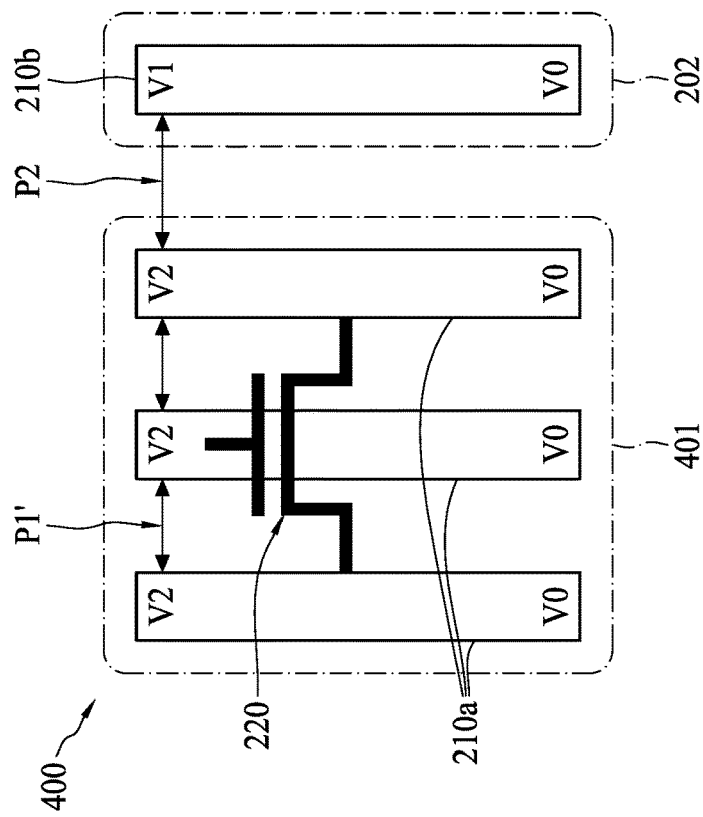

FIG. 4A and FIG. 4B are diagrams illustrating a circuit layout 400 in accordance with some embodiments of the present disclosure. Referring to FIG. 4A, After the EDA tools distinguish the conductive lines 210a, 210b in different regions, the EDA tools may determine if a violation occurs in the first device 201 according to a second voltage level $\Delta V2$. The second voltage level $\Delta V2$ may be lower than the first voltage level $\Delta V1$. In some embodiments, the second voltage level $\Delta V2$ may be a customized voltage level for the first device 201. For example, the allowable testing level for the transistor 220 may be approximately 0.96 V, and a voltage V2 is thus approximately 0.96 V. The second voltage level $\Delta V2$ is then V2−V0=0.96 V. The second voltage level $\Delta V2$ for the transistor 220 may be approximately 0.96 V and is lower than the first voltage level $\Delta V1$ (e.g. 1.2 V). The second voltage level $\Delta V2$ is, of course, merely an example and is not intended to be limiting. Similar to the first voltage level $\Delta V1$, the second voltage level $\Delta V2$ is related to an allowable pitch range between the conductive lines 210a in the first device 201.

In some embodiments, the pitch P1 (shown in FIG. 3) may cause a violation under the first voltage level $\Delta V1$ but is allowable under the second voltage level $\Delta V2$. Thus, the failing signal that occurs under the first voltage level $\Delta V1$ for the pitch P1 in the first device 201 (shown in FIG. 3) may be a false alarm. A false alarm means that the pitch P1 is practically allowed for the first device 201 but indicated as a violation under the first voltage level $\Delta V1$. When the EDA tools determine that the pitch P1 is allowable under the second voltage level $\Delta V2$ for the first device 201, the pitch P1 may be maintained. While the EDA tools re-check the circuit layout 200, the EDA tools may also re-check the pitch P2 according to the first voltage level $\Delta V1$. If no failing signal occurs for the pitch P2, the pitch P2 in the connecting portion 202 may be maintained. The EDA tools may generate the circuit layout 200 according to the first device 201 and the connecting portion 202. The integrated device may then be generated according to the circuit layout 200 (shown in FIG. 3).

Referring to FIG. 4A, in other embodiments, when the EDA tools determine that the pitch P1 is a true violation under the second voltage level $\Delta V2$, the pitch P1 in the first device 201 may be changed to a pitch P1'. A true violation means that the pitch P1 is not allowed for the first device 201 even under the second voltage level $\Delta V2$. The pitch P1' may be larger than the pitch P1 in FIG. 3. The pitch P1' is the allowed pitch under the second voltage level $\Delta V2$. While the EDA tools re-check the circuit layout 300, the EDA tools may also re-check the pitch P2 according to the first voltage level $\Delta V1$. If no failing signal occurs for the pitch P2, the pitch P2 in the connecting portion 202 may be maintained. The EDA tools may generate the circuit layout 400 according to the modified first device 401 and the connecting portion 202. The integrated device may be generated according to the circuit layout 400.

Referring to FIG. 4B, after the re-checking of the pitch P2, the failing signal may still occurs for the pitch P2 under the first voltage level $\Delta V1$. The pitch P2 between the conductive line 210b in the connecting portion 202 and the immediately adjacent conductive line 210a is then changed to a pitch P2'. The pitch P2' is the allowed pitch under the first voltage level $\Delta V1$. The pitch P2' may be larger than the pitch P2 in FIG. 3. In some embodiments, the EDA tools may generate the circuit layout 400' according to the modified first device 401 and the modified pitch P2' of the connecting portion 402. The integrated device may then be generated according to the circuit layout 400'.

Briefly, the above-mentioned embodiments provide a method to re-check the circuit layout 200 when a failing signal occurs for the pitch in the first device 201. In some existing approaches, when a failing signal occurs, the circuit layout 200 may need to be re-checked manually to determine if there is a false alarm. In the present embodiments, the EDA tools may automatically analyze the conductive lines in the first device 201, and then apply a customized voltage level to check if the pitch in the first device is a true violation. The burden of a manual re-check may thus be alleviated.

Figure 5:
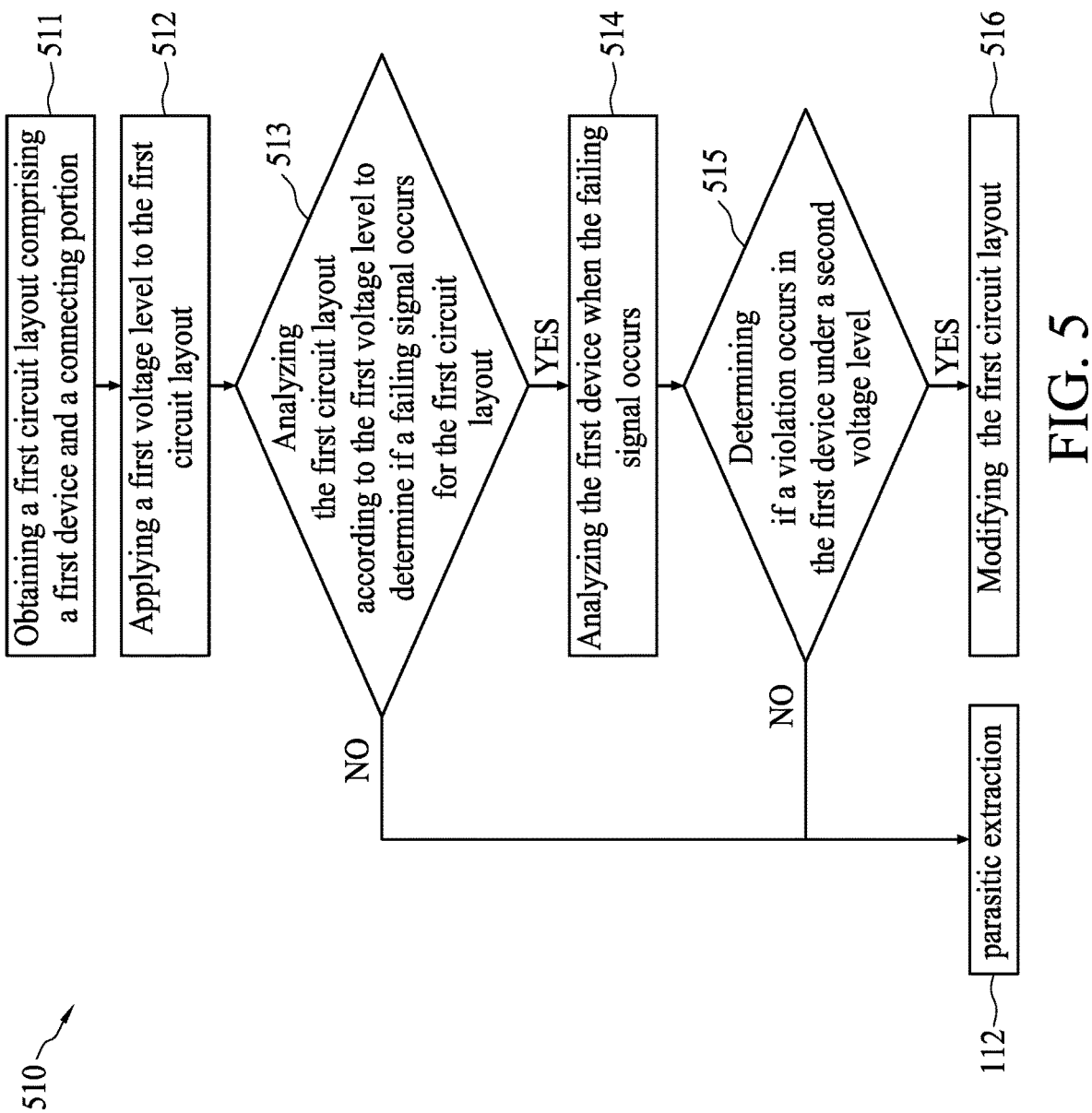
FIG. 5 is a flowchart illustrating a design rule check (DRC) stage in accordance with some embodiments of the present disclosure.

FIG. 5 is a flowchart illustrating a DRC check stage 510 in accordance with some embodiments of the present disclosure. The DRC check stage 510 may be performed on the circuit layout 200 in FIG. 2. The DRC check stage 510 may include operations 511 to 516. In operation 511, a first circuit layout 200 is obtained. The first circuit layout 200 may include a first device 201 and a connecting portion 202.

In operation 512, a first voltage level $\Delta V1$ is applied to the first circuit layout 200. In operation 513, the first circuit layout 200 is analyzed according to the first voltage level $\Delta V1$ to determine if a failing signal occurs for the first circuit layout 200. In operation 514, the first device 201 is analyzed when a failing signal is detected. In operation 515, it is determined, based on a second voltage level $\Delta V2$, if a violation occurs in the first device 201. In operation 516, the first circuit layout 400 is modified when a violation occurs.

The detail descriptions are similar to the descriptions in FIG. 2, FIG. 3, FIG. 4A, and FIG. 4B, and thus are omitted for brevity.

Figure 6:
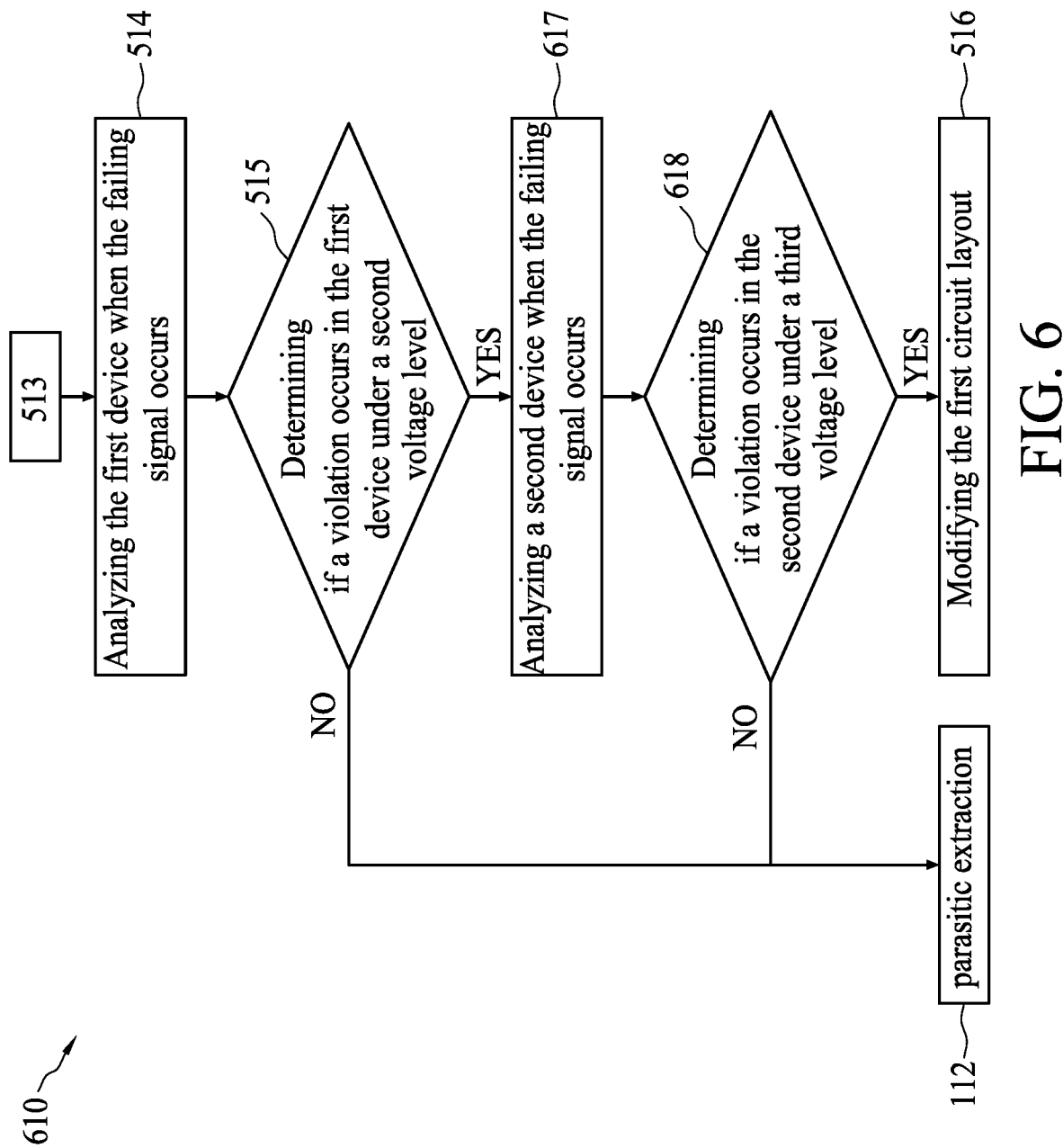
FIG. 6 is a flowchart illustrating a DRC stage in accordance with some embodiments of the present disclosure.

FIG. 6 is a flowchart illustrating a DRC check stage 610 in accordance with some embodiments of the present disclosure. The operations 513 to 516 are described in FIG. 2, FIG. 3, FIG. 4A, FIG. 4B, and FIG. 5, and the detailed description is omitted herein for brevity. In some embodiments, the DRC check stage 610 may further include operations 617 and 618. In operation 617, a second device in the circuit layout is analyzed when the failing signal occurs. In operation 618, it is determined whether a violation occurs in the second device under a third voltage level.

In some embodiments, the second device may include one of a transistor, a resistor, a diode, or other electrical components. The second device may be the same electrical component as the first device (such as a transistor 220 in FIG. 2), or may be a different electrical component from the first device. In some embodiments, the second device may be adjacent to the connecting portion 202 (as in FIG. 2). It is noted that the first device and the second device may refer to different electrical components. For example, the first device refers to all the same transistors and the second device refers to all the same resistors in the circuit layout. Thus, all the first devices in the circuit layout are analyzed in operations 514 and 515, and all the second devices in the circuit layout are analyzed in operations 617 and 618.

In some embodiments, the third voltage level is lower than the first voltage level. The third voltage level may be a predetermined voltage level for the second device. In some embodiments, the third voltage level may be related to an allowable pitch range between the conductive lines in the second device. In some embodiments, the third voltage level may be the same as or different from the second voltage level.

In some embodiments, if the EDA tools determine that the pitch in the second device is allowable under the third voltage level, the pitch in the third device may be maintained. In other embodiments, if the EDA tools determine that the pitch in the second device is a violation under the third voltage level, the pitch in the second device may be modified.

Figure 7:
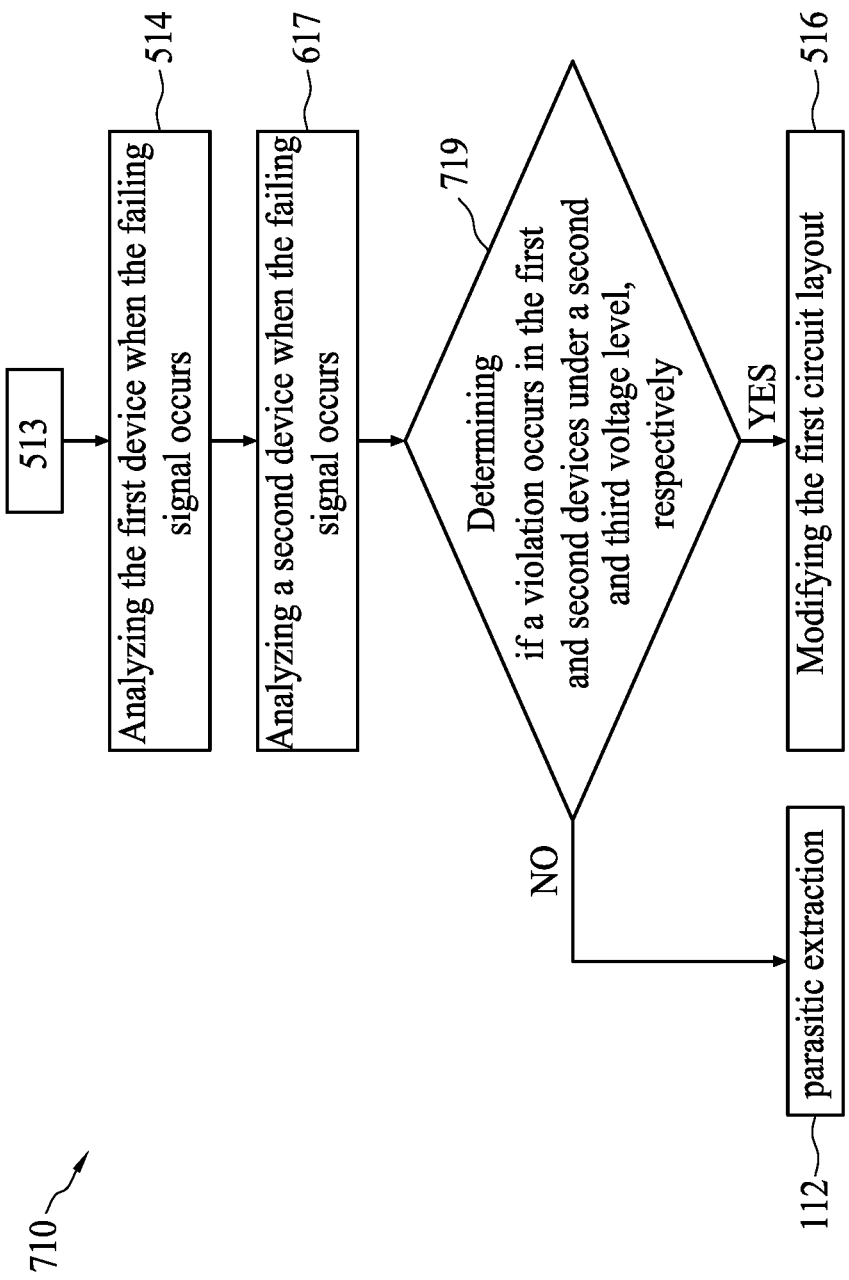
FIG. 7 is a flowchart illustrating a DRC stage in accordance with some embodiments of the present disclosure.

FIG. 7 is a flowchart illustrating a DRC check stage 710 in accordance with some embodiments of the present disclosure. The operations 513, 514, 516, 617 are described in FIG. 2, FIG. 3, FIG. 4A, FIG. 4B, FIG. 5, and FIG. 6, and the detailed description is omitted herein for brevity. In some embodiments, the DRC check stage 710 may further include operation 719. In operation 719, the first and second device in the circuit layout is determined if a violation occurs under the second and third voltage levels, respectively. The difference between the DRC check stage 610 in FIG. 6 and the DRC check stage 710 is that the EDA tools may analyze the first device and the second device in the same operation, and then determine if a violation occurs in the first and second device under a second and third voltage levels, respectively. In some embodiments, the EDA tools may modify at least one of the first and second devices in the same operation.

Briefly, the above-mentioned embodiments provide a method to re-check the circuit layout 200 when a failing signal occurs for the pitch in the different devices of the circuit layout. The EDA tools may automatically analyze which conductive lines are in the different devices, and may then apply a customized voltage level to check if the pitch in each device is a false alarm or a true violation. The burden of a manual re-check may thus be alleviated.

Figure 8:
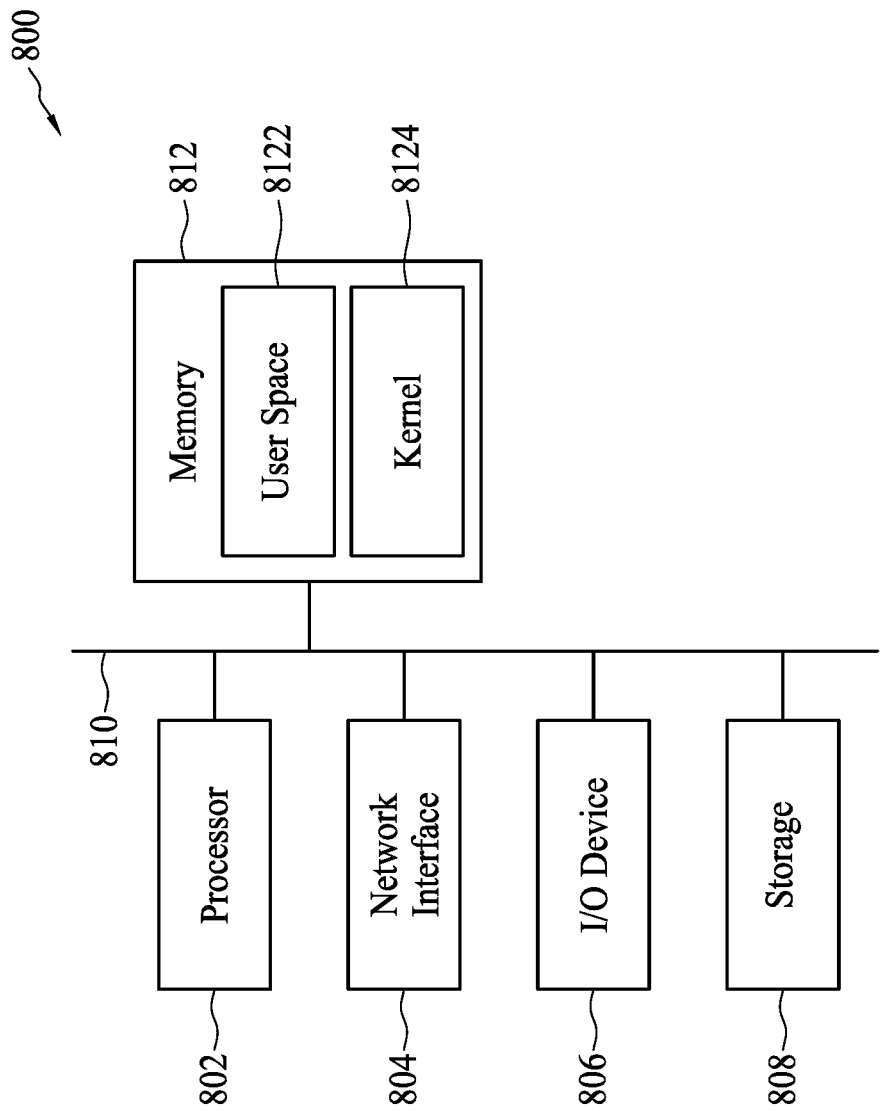
FIG. 8 is a diagram of a hardware system for implementing the DRC stage to generate the second circuit layout in accordance with some embodiments.

FIG. 8 is a diagram of a hardware system 800 for implementing the DRC check stage 110 (or the DRC check stage 510, 610, or 710) to generate the second circuit layout 400 in accordance with some embodiments. The system 800 includes at least one processor 802, a network interface 804, an input and output (I/O) device 806, a storage 808, a memory 812, and a bus 810. The bus 810 couples the network interface 804, the I/O device 806, the storage 808 and the memory 812 to the processor 802.

In some embodiments, the memory 812 includes a random access memory (RAM) and/or other volatile storage device and/or read only memory (ROM) and/or other nonvolatile storage device. The memory 812 includes a kernel 8124 and user space 8122, configured to store program instructions to be executed by the processor 802 and data accessed by the program instructions.

In some embodiments, the network interface 804 is configured to access program instructions and data accessed by the program instructions stored remotely through a network. The I/O device 806 includes an input device and an output device configured for enabling user interaction with the system 800. The input device includes, for example, a keyboard, a mouse, etc. The output device includes, for example, a display, a printer, etc. The storage device 808 is configured for storing program instructions and data accessed by the program instructions. The storage device 808 includes, for example, a magnetic disk and an optical disk.

In some embodiments, when executing the program instructions, the processor 802 is configured to perform the operations of the DRC check stage 110 (or the DRC check stage 510, 610, and 710) as described with reference to FIG. 1 (or FIG. 5, FIG. 6, and FIG. 7).

In some embodiments, the program instructions are stored in a non-transitory computer readable recording medium such as one or more optical disks, hard disks and nonvolatile memory devices.

Figure 9:
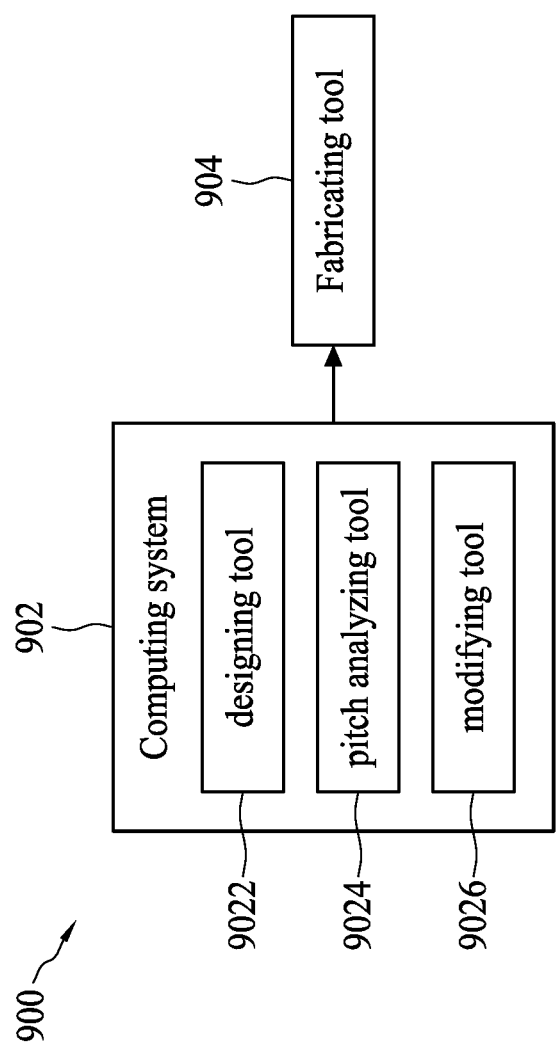
FIG. 9 is a diagram of a system for fabricating the second circuit layout in accordance with some embodiments.

FIG. 9 is a diagram of a system 900 for fabricating the second circuit layout 400 in accordance with some embodiments. The system 900 includes a computing system 902 and a fabricating tool 904. The computing system 902 is arranged to perform operations of the DRC check stage 110 (or the DRC check stage 510, 610, or 710) to generate the modified circuit layout 400 of the integrated device. According to some embodiments, the computing system 902 may include the hardware system 800 in FIG. 7. In some embodiments, the computing system 902 may include a designing tool 9022, a pitch analyzing tool 9024, and a modifying tool 9026. In one or more embodiments, the computing system 902 may function as the EDA tools.

The designing tool 9022 is arranged to provide a first circuit layout 200 having a plurality of conductive lines formed therein. The first circuit layout may be the circuit layout 200. The designing tool 9022 may be implemented by the processor 802 and the storage 808, in which the processor 802 may access the storage 808 to provide a stored first circuit cell.

The pitch analyzing tool 9024 is arranged to analyze a first pitch P1 and a second pitch P2 of the conductive lines 210a and 210b to determine if a violation occurs in the conductive lines 210a and 210b. For brevity, the pitch analyzing tool 9024 may analyze the first pitch P1 and the second pitch P2 of the conductive lines 210a and 210b using the operations described in FIG. 2, FIG. 3, FIG. 5, FIG. 6, and FIG. 7. The pitch analyzing tool 9024 may be implemented by the processor 802, in which the processor 802 may analyze the first pitch P1 and the second pitch P2 of the conductive lines 210a and 210b to determine if the violation occurs in the second pitch P2 of the conductive lines 210b according to a first voltage level ΔV1 and in the first pitch P1 of the conductive lines 210a according to a second voltage level ΔV2.

The modifying tool 9026 is arranged to modify the first pitch P1 and the second pitch P2 for generating a second circuit layout 400 when the pitch analyzing tool 9024 indicates that the violation occurs in the conductive lines 210a or 210b. For brevity, the modifying tool 9026 may modify the first pitch P1 and the second pitch P2 using the operations described in FIG. 4A and FIG. 4B. The modifying tool 9026 may be implemented by the processor 802, in which the processor 802 may modify the first pitch P1 and the second pitch P2 to generate the second circuit layout 400.

The fabricating tool 904 may be a cluster tool for fabricating an integrated device. The cluster tool may be a multiple reaction chamber type composite equipment which includes a polyhedral transfer chamber with a wafer handling robot inserted at the center thereof, a plurality of process chambers positioned at each wall face of the polyhedral transfer chamber; and a load lock chamber installed at a different wall face of the transfer chamber. At the fabrication stage, at least one photomask is used, for example, for one patterning operation for forming a feature of ICs, such as gate lines of transistors, source or drain regions for the transistors, metal lines for interconnects and vias for the interconnects, on a wafer.

Briefly, the above-mentioned embodiments provide a system to re-check the circuit layout when a failing signal occurs for the pitch in the different devices of the circuit layout. In some existing approaches, when a failing signal occurs, the circuit layout 200 may need to be re-checked manually to determine if there is a false alarm. In the present embodiments, the pitch analyzing tool may automatically analyze which conductive lines are in the different devices, and may then apply a customized voltage level to check if the pitch in each device is a true violation. The burden of a manual re-check may thus be alleviated.

According to some embodiments, a method for forming an integrated device is provided. The method includes the following operations. A first circuit layout is provided. The first circuit layout includes a first device and a connecting portion. A first voltage level is applied to the first circuit layout. The first circuit layout is analyzed according to the first voltage level to determine if a failing signal occurs in the first circuit layout. The first device is analyzed when the failing signal occurs. It is determined, according to a second voltage level, whether a violation occurs in the first device. The first circuit layout is modified when a violation occurs.

According to other embodiments, a method for forming an integrated device is provided. A first circuit layout is provided. The first circuit layout may include a plurality of conductive lines. A first voltage level is applied to the first circuit layout. The first circuit layout is analyzed according to the first voltage level to determine if a failing signal occurs in the first circuit layout. A first pitch of the conductive lines is analyzed when the failing signal occurs. It is determined, according to a second voltage level, whether a violation occurs in the first pitch.

According to other embodiments, a system for forming an integrated device is provided. The system includes a designing tool, a pitch analyzing tool, a modifying tool, and a fabricating tool. The designing tool is arranged to provide a first circuit layout having a plurality of conductive lines formed therein. The pitch analyzing tool is arranged to analyze a first pitch and a second pitch of the conductive lines to determine if a violation occurs in the conductive lines. The modifying tool is arranged to modify the first pitch and the second pitch for generating a second circuit layout when the pitch analyzing tool indicates that the violation occurs in the conductive lines. The fabricating tool is arranged to generate the integrated device according to the second circuit cell. The pitch analyzing tool determines if the violation occurs in the second pitch of the conductive lines according to a first voltage level and in the first pitch of the conductive lines according to a second voltage level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an integrated device, the method comprising:
   obtaining a first circuit layout comprising a first conductive line and a second conductive line spaced apart from each other by a first pitch;
   determining, in response to a failing signal, which indicates that the first pitch is outside of an allowable range corresponding to a first voltage difference, whether the first pitch is outside of an allowable range corresponding to a second voltage difference different from the first voltage difference; and
   generating a modified first circuit layout by modifying the first pitch of the first circuit layout when the first pitch is outside of the allowable range corresponding to the second voltage difference.

2. The method of claim 1, wherein the second voltage difference is less than the first voltage difference.

3. The method of claim 1, further comprising:
   maintaining the first pitch when the first pitch is within the allowable range corresponding to the second voltage difference; and
   generating the integrated device according to the first circuit layout.

4. The method of claim 1, wherein the first circuit layout comprises a plurality of conductive lines.

5. The method of claim 1, wherein the first conductive line and the second conductive line are disposed in a first device region of the first circuit layout, wherein the first circuit layout further comprises a third conductive line in a connecting portion region, and the second conductive line and the third conductive line are spaced apart from each other by a second pitch, the method comprising:
   distinguishing, in response to the failing signal, which indicates that the first pitch is outside of the allowable range corresponding to the first voltage difference, the first conductive line and the second conductive line in the first device region from the third conductive line in the connecting portion region.

6. The method of claim 5, wherein the first circuit layout further comprises a fourth conductive line and a fifth conductive line spaced apart from each other by a third pitch disposed in a second device region adjacent to the connecting portion region, the method further comprising:

determining, in response to the failing signal, which indicates that the first pitch is outside of the allowable range corresponding to the first voltage difference, whether the third pitch is outside of an allowable range corresponding to a third voltage difference different from the first voltage difference.

7. The method of claim 6, further comprising:

generating the modified first circuit layout by modifying the third pitch of the first circuit layout when the third pitch is outside of the allowable range corresponding to the third voltage difference.

8. The method of claim 6, wherein the third voltage difference is less than the first voltage difference.

9. The method of claim 5, wherein the first pitch is less than the second pitch.

10. The method of claim 9, wherein the first pitch is allowed at the second voltage difference.

11. The method of claim 5, wherein the determining, in response to the failing signal, which indicates that the first pitch is outside of the allowable range corresponding to the first voltage difference, whether the first pitch is outside of the allowable range corresponding to the second voltage difference comprises:

determining, in response to the failing signal, which indicates that the first pitch is outside of the allowable range corresponding to the first voltage difference, whether the first pitch is outside of the allowable range corresponding to the second voltage difference different from the first voltage difference after the first conductive line and the second conductive line in the first device region are distinguished.

12. The method of claim 11, further comprising:

determining, in response to the failing signal, which indicates that the first pitch is outside of the allowable range corresponding to the first voltage difference, whether the second pitch is outside of the allowable range corresponding to the second voltage difference; and generating the modified first circuit layout by modifying the second pitch of the first circuit layout when the second pitch is outside of the allowable range corresponding to the second voltage difference.

13. A method for forming an integrated device, the method comprising:

obtaining a first circuit layout comprising a plurality of conductive lines, the conductive lines comprising a first conductive line and a second conductive line spaced apart from each other by a first pitch;

applying a first voltage difference to the first circuit layout;

applying, in response to a failing signal, which indicates that the first pitch is outside of an allowable range corresponding to the first voltage difference, a second voltage difference different from the first voltage difference to the first circuit layout;

determining, in response to the failing signal, which indicates that the first pitch is outside of the allowable range corresponding to the first voltage difference, whether the first pitch is outside of an allowable range corresponding to the second voltage difference; and generating a modified first circuit layout by modifying the first pitch of the first circuit layout when the first pitch is outside of the allowable range corresponding to the second voltage difference.

14. The method of claim 13, wherein the second voltage difference is less than the first voltage difference.

15. The method of claim 13, wherein the first pitch is allowed at the second voltage difference.

16. The method of claim 13, further comprising:

maintaining the first pitch when the first pitch is within the allowable range corresponding to the second voltage difference;

generating the first circuit layout according to the first pitch; and generating the integrated device according to the first circuit layout.

17. The method of claim 13, wherein the first circuit layout further comprises a third conductive line spaced apart from the second conductive line by a second pitch, the method comprising:

determining, in response to the failing signal, which indicates that the first pitch is outside of the allowable range corresponding to the first voltage difference, whether the second pitch is outside of the allowable range corresponding to the second voltage difference.

18. The method of claim 17, the method comprising:

generating the modified first circuit layout by modifying the second pitch of the first circuit layout when the second pitch is outside of the allowable range corresponding to the second voltage difference.

19. A system for forming an integrated device, comprising:

a designing tool, arranged to provide a first circuit layout having a first conductive line and a second conductive line spaced apart from each other by a first pitch;

a pitch analyzing tool configured to, in response to a failing signal which indicates that the first pitch is out of an allowable range corresponding to a first voltage difference, determine whether the first pitch is out of an allowable range corresponding to a second voltage difference different from the first voltage difference, wherein the first voltage difference and the second voltage difference are individually associated with a testing voltage of a design rule;

a modifying tool, configured to generate a modified first circuit layout by modifying the first pitch of the first circuit layout when the pitch analyzing tool indicates that the first pitch is out of the allowable range corresponding to the second voltage difference; and a fabricating tool, arranged to generate the integrated device according to the modified first circuit layout.

20. The system of claim 19, wherein the second voltage difference is lower than the first voltage difference.

* * * * *